(12) United States Patent
Cave et al.

(10) Patent No.: US 9,016,906 B2
(45) Date of Patent: Apr. 28, 2015

(54) APPARATUS AND METHODS FOR ILLUMINATING DISPLAY PANELS OF ELECTRONIC DEVICES

(71) Applicant: The Nielsen Company (US), LLC, Schaumburg, IL (US)

(72) Inventors: Mark R. Cave, Palm Harbor, FL (US); Kendall E. Shirilla, Tampa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 14/140,195

(22) Filed: Dec. 24, 2013

(65) Prior Publication Data
US 2014/0111964 A1 Apr. 24, 2014

Related U.S. Application Data

(63) Continuation of application No. 13/249,911, filed on Sep. 30, 2011, now Pat. No. 8,678,624.

(60) Provisional application No. 61/388,929, filed on Oct. 1, 2010.

(51) Int. Cl.
*F21S 13/10* (2006.01)
*F21V 15/00* (2006.01)
(Continued)

(52) U.S. Cl.
CPC ............... *G01D 11/28* (2013.01); *B23P 11/00* (2013.01); *F21V 15/00* (2013.01); *F21V 21/00* (2013.01); *F21V 15/01* (2013.01); *F21V 23/005* (2013.01); *H01H 13/70* (2013.01); *H04H 60/45* (2013.01)

(58) Field of Classification Search
USPC .......... 362/361–364, 249.01, 366, 28, 29–30, 362/85, 97.1, 97.4, 227, 240–241, 243, 362/296.01, 310, 296.05, 296.09, 341, 555
See application file for complete search history.

(56) References Cited

U.S. PATENT DOCUMENTS

| 1,965,916 A | 7/1934 | Wise |
| 2,846,663 A * | 8/1958 | Heehler et al. ........... 340/815.77 |

(Continued)

FOREIGN PATENT DOCUMENTS

WO 2009070183 6/2009

OTHER PUBLICATIONS

United States Patent and Trademark Office, "Non-final Office Action," issued in connection with U.S. Appl. No. 13/249,911, Jul. 29, 2013, 19 pages.

(Continued)

*Primary Examiner* — Anne Hines
*Assistant Examiner* — Jose M Diaz
(74) *Attorney, Agent, or Firm* — Hanley, Flight & Zimmerman, LLC

(57) ABSTRACT

An example electronic device includes a printed circuit board having a first row of light sources coupled to a first surface of the printed circuit board and a second row of light sources coupled to a second surface of the printed circuit board; a panel having a plurality of visual indicators; an first housing having a first row of chambers each having a first opening to receive one of the first row of light sources and a second opening to communicate light from the one of the first row of light sources to one of the visual indicators; and a second housing having a second row of chambers each having a third opening to receive one of the second row of light sources and a fourth opening to communicate light from the one of the second row of light sources to a second one of the visual indicators.

20 Claims, 6 Drawing Sheets

(51) Int. Cl.
*G01D 11/28* (2006.01)
*B23P 11/00* (2006.01)
*F21V 21/00* (2006.01)
*F21V 15/01* (2006.01)
*F21V 23/00* (2006.01)
*H01H 13/70* (2006.01)
*H04H 60/45* (2008.01)

(56) References Cited

U.S. PATENT DOCUMENTS

| | | | |
|---|---|---|---|
| 4,163,883 A | 8/1979 | Boulanger | |
| 4,394,546 A | 7/1983 | Harumatsu | |
| 4,924,044 A | 5/1990 | Takahashi et al. | |
| 5,053,928 A | 10/1991 | Pasco | |
| 5,203,226 A * | 4/1993 | Hongou et al. | 74/552 |
| 5,708,428 A | 1/1998 | Phillips | |
| 5,801,345 A | 9/1998 | Mikula-Curtis et al. | |
| 5,988,842 A | 11/1999 | Johnsen et al. | |
| 6,217,183 B1 | 4/2001 | Shipman | |
| 7,203,338 B2 | 4/2007 | Ramaswamy et al. | |
| D587,224 S | 2/2009 | Chun et al. | |
| 7,566,138 B2 | 7/2009 | Inoue | |
| 7,636,748 B2 | 12/2009 | Duarte et al. | |
| D619,576 S | 7/2010 | Kawano | |
| 7,784,742 B2 | 8/2010 | Chen et al. | |
| 8,425,079 B2 | 4/2013 | Shiraishi et al. | |
| 2006/0291225 A1* | 12/2006 | Todd et al. | 362/494 |
| 2008/0266832 A1* | 10/2008 | Tamura | 362/26 |
| 2009/0040075 A1 | 2/2009 | Liu et al. | |
| 2009/0080176 A1 | 3/2009 | Claprood | |
| 2011/0141732 A1 | 6/2011 | Shiraishi et al. | |

OTHER PUBLICATIONS

United States Patent and Trademark Office, "Notice of Allowance," issued in connection with U.S. Appl. No. 13/249,911, Nov. 25, 2013, 20 pages.

* cited by examiner

APPARATUS AND METHODS FOR ILLUMINATING DISPLAY PANELS OF ELECTRONIC DEVICES

CROSS REFERENCE TO RELATED APPLICATION

This patent arises from a continuation of U.S. patent application Ser. No. 13/249,911, filed Sep. 30, 2011, now U.S. Pat. No. 8,678,624, which claims the benefit of U.S. Provisional Patent Application Ser. No. 61/388,929, filed on Oct. 1, 2010. U.S. patent application Ser. No. 13/249,911 and U.S. Provisional Patent Application Ser. No. 61/388,929 are hereby incorporated herein by reference in their entireties.

BACKGROUND

Audience measurement companies seek to determine the demographic composition of audiences exposed to various types of media (e.g., television, radio, internet, etc.). To this end, audience measurement companies enlist a plurality of persons to cooperate in an audience measurement study. The demographic data associated with these persons (hereinafter panelists) is collected at registration and used to statistically determine the size and demographics of a general audience.

Data reflecting media exposure can be collected through manual surveys or through automated methods that, for example, identify tuned channels and/or content. To perform automated collection of such exposure data, the audience measurement company installs one or more monitoring meters in the monitored household, and/or causes the panelist to carry a portable metering device.

In examples in which the exposures are collected via a stationary meter (as opposed to a portable meter carried by a specific panelist), people meter functionality is also provided in the panelist's household. The people meter collects audience identification data by periodically or aperiodically prompting audience members in the monitored household to identify themselves as present in the audience. The audience identification data and the exposure data can then be complied with the demographic data collected from the panelists during registration to develop metrics reflecting, for example, the demographic composition of the audience.

DETAILED DESCRIPTION

Figure 1:
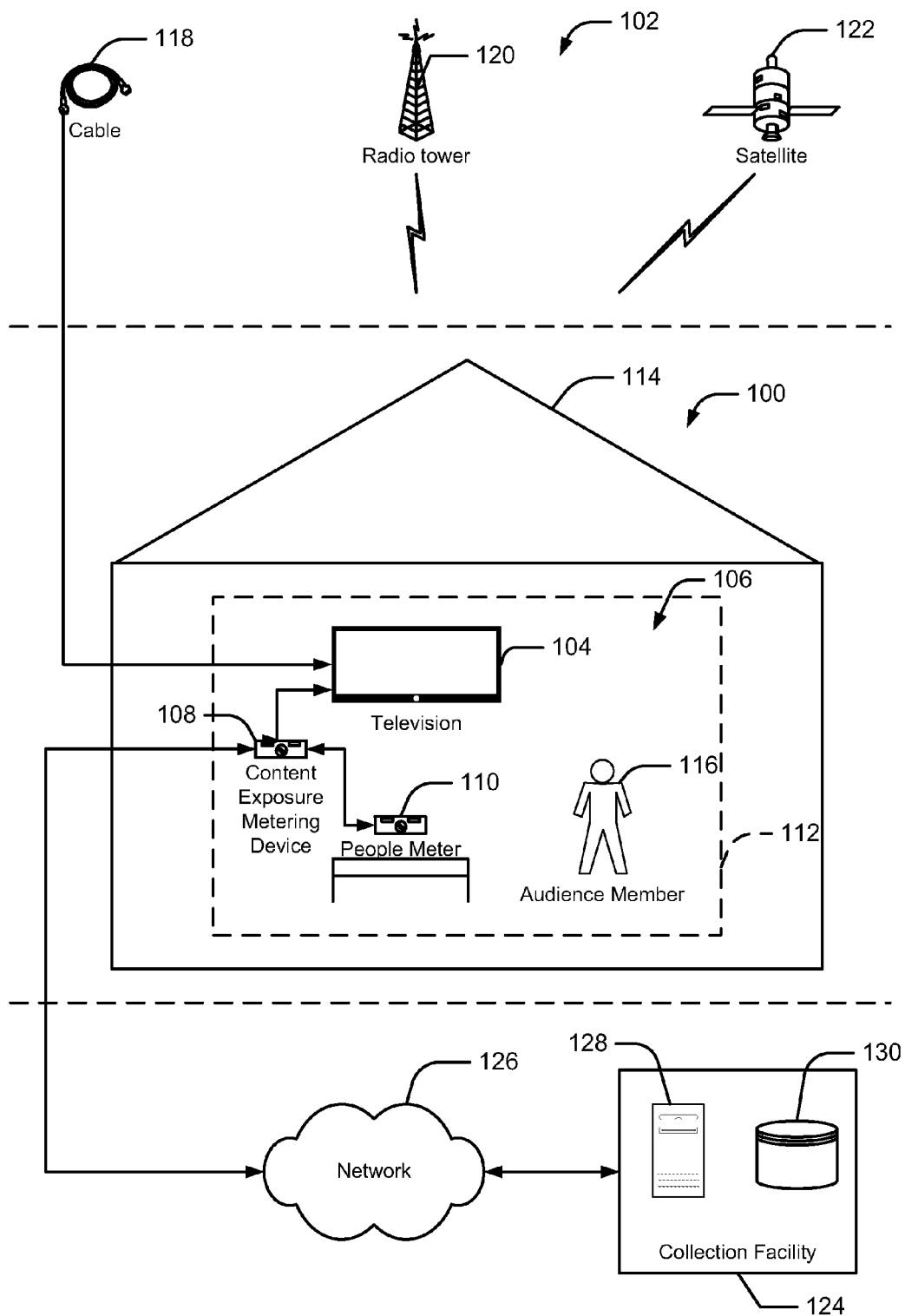
FIG. 1 illustrates an example audience measurement system constructed in accordance with the teachings of this disclosure.

Example apparatus and methods for illuminating display panels of electronic devices disclosed herein significantly increase the illumination effectiveness of a light source while significantly decreasing manufacturing complexity and costs. Some such example apparatus and methods may be used to illuminate a display panel of an audience metering device (e.g., a people meter) used by an audience measurement company to collect audience composition and/or exposure data regarding television and/or radio programming, internet activity, advertisement exposure, etc. Example apparatus and methods disclosed herein may additionally or alternatively be used to illuminate any other types of electronic apparatus having an illuminated display and any other purpose or function. For example, example apparatus and methods disclosed herein may be employed to illuminate a display panel or visual indicator of a consumer electronic device such as a video game player, a television, a set-top box, a blue-ray player, a personal digital recorder, a digital versatile disk (DVD) player, a portable device (e.g., a portable people meter), a mobile device (e.g., an MP3 player, a cellular phone, etc., and/or any other display panel of any other type of electronic device that may be illuminated.

Audience measurement systems to collect audience measurement data in respective households of panelists often include a content exposure metering device to collect channel and/or program identification data and a people meter to collect audience identification data. The audience measurement company monitors viewing habits of panelists via the content exposure metering device and the people meter. The content exposure metering device collects data to identify tuned channels and/or identify content presented in the household (e.g., by collecting codes broadcasted with programs, signatures or fingerprints representing a preferably unique aspect of the content, and/or metadata. The people meter collects data to identify the persons exposed to the content identified by the content exposure meter.

The content exposure metering device measures various signals associated with a monitored information presenting device (e.g., a television or radio) for a variety of purposes including, but not limited to, determining the operational status of the information presenting device (i.e., whether the device is off or on) and identifying programming displayed by the information presenting device.

As noted above, audience measurement companies collect demographic data about panelists to enable extrapolation of the media exposure habits of the panelists to a general audience. The demographic data includes, for example, age, gender, income level, educational level, marital status, geographic location, race, etc., of the panelist. As noted above, to enable correlation of the collected program identification data with demographic data, audience measurement companies often utilize the people meter. The people meter is an electronic device that is typically disposed in a monitored household proximate to one or more of the monitored information presenting devices. The people meter periodically or aperiodically prompts viewers to self-identify. For example, the people meter may prompt audience members in response to any number of triggers, including, for example a channel change or an elapsed period of time. Additionally, the people meter may prompt the audience members to input information by depressing one of a set of buttons, each of which is assigned to represent a different household member. Alternatively, audience members may self-identify by entering an identification code and/or their name into the people meter. For example, the people meter may prompt the audience members to register (i.e., log in) and/or may prompt the audience members to indicate whether they are still present in the viewing audience. This audience identification data is subsequently combined with the collected program identification data.

People meters typically include a display panel which may be selectively illuminated to prompt audience members to self-identify. For example, the display panel may include a plurality of visual indicators (e.g., light indicators) that prompt an audience member to input information. For example, the display panel may include a plurality of lights that illuminate (e.g., flash or blink on and off) to request the audience member(s) to self-identify and/or indicate that he/she is present.

Conventional people meters typically include a housing having a light source disposed therein to illuminate some or all of a display panel (e.g., a front panel display). The display panel includes a plurality of visual indicators that are selectively illuminated by the light source to prompt an audience member/panelist to self-identify. The light source of a conventional people meter typically includes traditional "leaded" light emitting diodes that are manually soldered to a printed circuit board (PCB) and are then physically bent in a direction toward the area requiring illumination. For example, the LED's are bent toward the display panel. However, manually soldering the leaded LED's to the printed circuit board and then bending them in position is a time consuming manufacturing process, which increases the cost(s) of manufacturing the people meter. Further, the overall height and/or position of the bent leaded LED relative to the printed circuit board may be inconsistent or outside of manufacturing tolerances, thereby providing insufficient or unacceptable levels of illumination to properly illuminate the display panel.

In other known people meters, the light source includes a plurality of surface mounted LED's which are manufactured or coupled to a printed circuit board. For example, the LED's may be surface mounted to a PCB via a component placement machine and a heat source to bond the LED to the PCB. The light emitted by the LED's is captured by a light pipe or light tube (e.g., a clear plastic light pipe), which directs the light emitted by the LEDs to the areas requiring illumination. However, these light tubes typically have a highly complex shape that uses either curving bends (e.g., gradual or soft bends) as in an optic fiber or have sharp prismatic folds which reflect off the angled corners. Thus, using surface mounted LEDs with a separate light pipe increases manufacturing complexity and costs. Further, the light pipe may reduce the efficiency of the LED because light emitted from the LED may lose energy as a result of passing through the light pipe. This may require energizing the LED with a relatively greater amount of electrical current to compensate for this energy loss, thereby consuming a higher percentage of power and possibly generating additional heat. The light pipe may reduce the effectiveness of the people meter. For example, the light pipe may provide unacceptably low levels of illumination of the panel display (e.g., a dim display). As a result, a user may not notice the visual indication provided by the people meter and the audience member may fail to input the required information (e.g., self-identify), thereby reducing the effectiveness of the people meter.

Example people meters disclosed herein illuminate a display panel without the use of traditional leaded LEDs and without the use of a traditional light pipe. Instead of a light pipe, a light passageway is formed within a housing of the electronic device between a light source disposed on a printed circuit board and a visual indicator of an electronic apparatus. In some examples, the light passageway is integrally formed with the housing. Such configuration increases the efficiency of the light source's illumination and significantly decreases manufacturing complexity and costs.

For example, a light source such as, for example, a light emitting diode (LED) is mounted (e.g., surface mounted) to a printed circuit board. The circuit board is mounted within a housing such that the light source is adjacent (e.g., immediately adjacent) a visual indicator of a display panel. Further, the housing includes a post that defines a chamber (e.g., a reflective chamber) and a light port adjacent the visual indicator. The post and/or the port may be integrally formed with the housing via, for example, injection molding. The light source of the printed circuit board is at least partially captured or received by the chamber of the post. The chamber reflects, deflects and/or channels the light emitted by the light source toward the light port of the housing. The light port is in optical communication with the chamber and the display panel indicator to allow light to emit or transmit from the chamber to the visual indictor of the display panel. In some examples, the chamber is self-sealed against a surface of the printed circuit board. In some examples, the chamber is defined by a wall portion having a semi-circular shape and an angled portion to concentrate or reflect the light toward the light port and, thus, to the display panel indicator. In some examples, the chamber includes a chrome finish or material (e.g., applied via a spray) to provide a mirror-like surface finish to enhance the efficiency of the chamber to collect and/or reflect the light emitted by the light source. In some examples, the chamber is integrally formed with the housing and is highly polished (e.g., via the tooling feature which creates the chamber), resulting in the mirror-like finish. In some examples, the light of the light source is emitted through a translucent area of an adhesive label mounted to an external face of the display panel.

FIG. 1 is a diagram of an audience measurement system. In the example of FIG. 1, a monitored household 100 is provided media by one or more media service provider(s) 102. An information presenting device 104 (e.g., a television) is metered using a content exposure metering device 108 and a people meter 110. In the example of FIG. 1, audience member (s) or panelist(s) 116 have permitted an audience measurement company to install the content exposure metering device 108 and the people meter 110 in a media exposure area 112 of a household 114 to collect program identification data and audience identification data.

The information presenting device 104 of the illustrated example is positioned in the media exposure area 112 located within the household 114 occupied by one or more people, referred to as audience member(s) or panelist(s) 116. The media exposure area 112 is the area in which the information presenting device 104 is located. The media output by the information presenting device 104 is accessible by one or more audience members 116 located in the media exposure area 112.

The media service provider 102 of the illustrated example may be any type or quantity of media service provider(s) 102 such as, but not limited to, a cable media service provider 118, a radio frequency (RF) media provider 120, an Internet based provider (e.g., IPTV) and/or a satellite media service provider 122. Thus, the media may be radio content, television content, pay per view content, movies, Internet Protocol Television (IPTV), satellite television (TV), Internet radio, satellite radio, digital television, digital radio, or any other type(s) of broadcast, multicast and/or unicast medium. In examples in which the information presenting device 104 is represented by a television, the television 104 receives a tuned subset of a plurality of signals transmitted via a plurality of channels by the media service provider(s) 102 and displays signals provided in any direct/implementation dependent format such as, for example, an National Television Standards Committee (NTSC) television signal format, a high definition television (HDTV) signal format, a digital video broadcasting (DVB) television signal format, etc. The programming content contained in the media signal includes, for example, a television program, a move, etc. Advertising such as an advertisement, and/or a preview of other programming that is or will be offered by the media service provider 102, etc is also typically contained in the media signal.

The example content exposure metering device 108 of FIG. 1 is a stationary device disposed on or near the information presenting device 104 and performs one or more of a variety of metering techniques. Depending on the type(s) of metering that the content exposure metering device 108 is to perform, the content exposure metering device 108 can be physically coupled to the information presenting device 104 or may instead be configured to capture signals emitted externally by the information presenting device 104 (e.g., free field audio) such that direct physical coupling to the information presenting device 104 is not required. A content exposure metering device 108 may be provided for each information presenting device 104 or other monitored media device disposed in the household 114, such that the content based metering devices 108 captures data regarding all in-home media viewing or exposure by the audience member(s) 116.

In the illustrated example, the people meter 110 responds to predetermined events (e.g., when the information presenting device is turned on, a channel is changed, etc.) by prompting the audience member(s) 116 to self-identify. The people meter 110 of the illustrated example collects inputs representative of the identities of the audience member(s) 116 (e.g., audience identification data) and provides the same to the content exposure metering device 108.

The content exposure metering device 108 of the illustrated example communicates with a remotely located central data collection facility 124 of the audience measurement entity via a network 126. The network 126 of the illustrated example is implemented using any type of public or private network such as, but not limited to, the Internet, a telephone network, a local area network (LAN), a cable network, and/or a wireless network. To enable communication via the network 126, the content exposure metering device 108 includes a communication interface that enables a connection to an Ethernet, a digital subscriber line (DSL), a telephone line, a coaxial cable, or any wireless connection, etc. The example content exposure metering device 108 of FIG. 1 sends program identification data and/or audience identification data to the central data collection facility 124 periodically, aperiodically and/or upon a request by the collection facility 124. The central data collection facility 124 of the illustrated example includes a server 128 and a database 130. The central data collection facility 124 processes and stores data received from the content exposure metering device 108.

The example collection facility 124 of FIG. 1 combines audience identification data and program identification data from multiple households 114. Additionally, the collection facility 124 integrates the demographic data collected from the panelists at, for example, registration with the data collected at the households 114. The example collection facility 124 receives the demographic information when the audience members 116 register and/or sign-up to be monitored. The collection facility 124 generates reports for advertisers, program producers and/or other interested parties based on the compiled statistical data. Such reports include extrapolations about the size and demographic composition of audiences of content, channels and/or advertisements based on the demographics and behavior of the monitored panelists.

Figure 2:
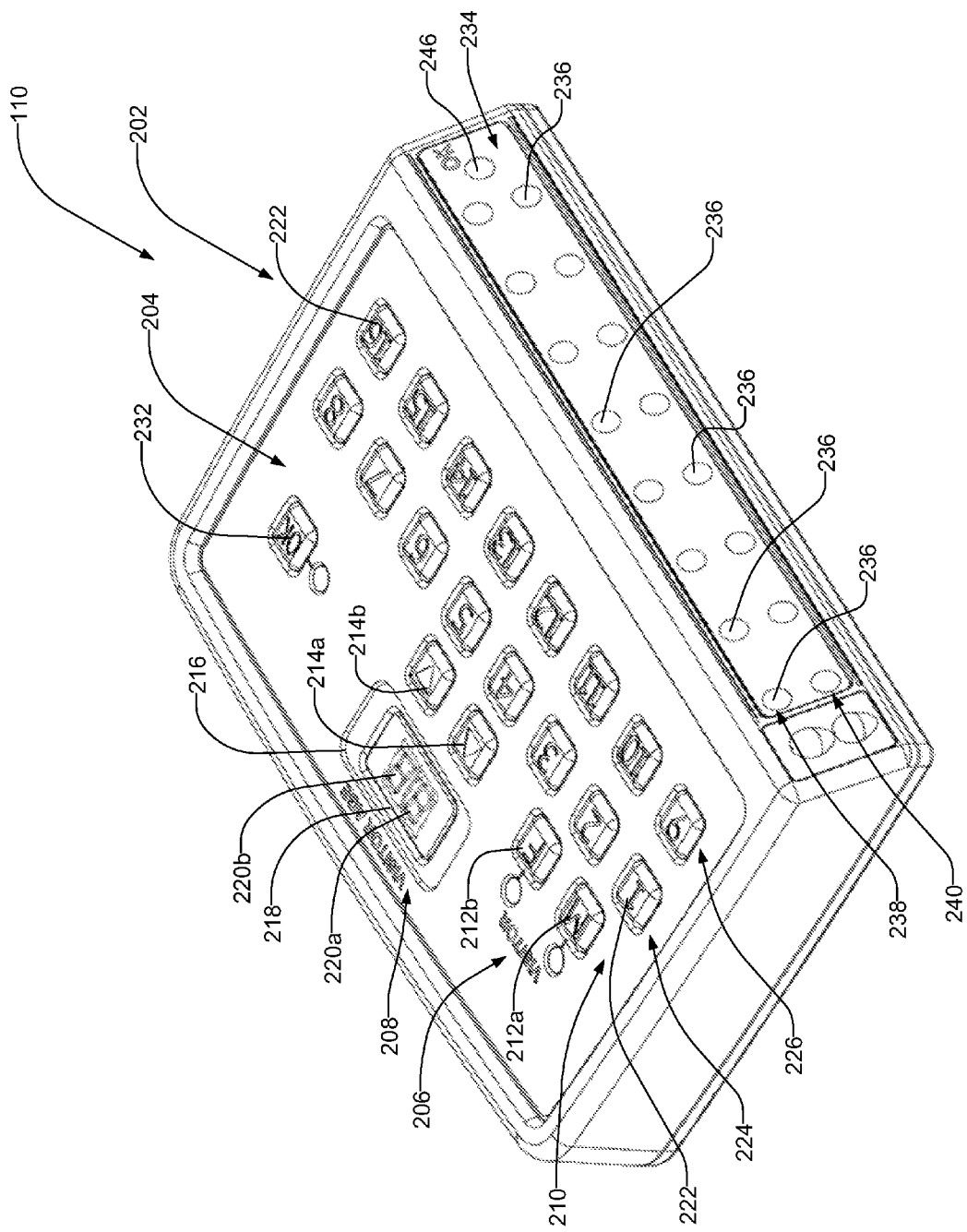
FIG. 2 illustrates the example people meter of FIG. 1.

FIG. 2 illustrates the example people meter 110 of FIG. 1 in further detail. In the example audience measurement system 106 of FIG. 1, the people meter 110 is disposed in the media exposure area 112 to provide visual instructions to audience member(s) 116 in the media exposure area 112 requesting the audience member(s) 116 to log their presence by pressing an apparatus input button. The example people meter 110 of FIG. 2 is implemented as a standalone device that is communicatively coupled to the content exposure metering device 108. Alternatively, the people meter 110 may be implemented as an integral part of the content exposure metering device 108.

As shown in FIG. 2, the example people meter 110 includes a user interface 202 that enables the audience member(s) 116 to input information to the people meter 110. This information includes registration data to configure the people meter 110 and/or demographic data to identify the audience member(s) 116. The user interface 202 includes, for example, a keyboard, touchpad, and/or keypad. In the example of FIG. 2, the user interface 202 includes a key pad 204. As shown in FIG. 2, the user interface 202 includes a visitor gender input interface 206, a visitor age input interface 208, and a panelist identification input interface 210. For example, the visitor gender input interface 206 includes a male gender button 212a and a female gender button 212b to enable an unregistered user (e.g., a visitor to a panelist household) to indicate his or her gender. The visitor age input interface 208 includes a first button 214a (e.g., with an arrow indicating up) and a second button 214b (e.g., with an arrow indicating down) adjacent an opening 216 that receives a display 218 (e.g., a liquid crystal display) to enable an unregistered user to register his or her age. For example, a first column 220a displays selectable number values between zero and nine representative of "tens" value digits and a second column 220b displays selectable number values between zero and nine representative of "ones" value digits. A user registers his or her age by using the first and/or second buttons 214a or 214b to increase or decrease the number value.

Additionally, as shown in this example, the panelist identification input interface 210 includes one or more identification buttons 222. In this example, the identification input interface 210 includes a first set or row of identification buttons 224 and a second set or row of identification buttons 226. As shown, the first set of identification buttons 224 includes a first plurality of identification buttons 222 (e.g., numbered one through eight) and the second set of identification buttons 226 includes a second plurality of identification buttons 222 (e.g., numbered nine through sixteen). Each of the identification buttons 222 may be assigned to represent a single, different one of the audience members 116 residing within the household 114. For example, if a household includes sixteen registered users, each identification button 222 may be assigned to represent a respective one of the sixteen registered users. Thus, a registered panelist need press only one button on the people meter 110 to identify their presence in the audience. In some examples, the visitor inputs 212a, 212b, 214a, 214b are used to input the panelist's demographic information. In such example, each user can register his or her information using the gender input interface 206 and the age input interface 208 and, thereafter, be assigned or represented by one of the plurality of identification buttons 222 of the identification input interface 210. In some examples, the identification input interface 210 additionally or alternatively enables the audience member(s) 116 to enter corresponding identification data (e.g., a name). After a user inputs his or her information, an enter or OK button 232 is activated to register the input information with the people meter 110 and/or the audience measurement system 106.

The people meter 110 of the illustrated example includes a display panel 234 (e.g., a front display panel) having at least one visual indicator 236 that provides a visual indication to prompt audience members 116 to self-identify via the people meter 110. In this example, the display panel 234 includes a first set or row 238 of visual indicators 236 and a second set or row 240 of visual indicators 236 to provide visual indications to prompt audience members 116. In the illustrated example, the first set of visual indicators 238 correlates or corresponds to respective ones of the first set of identification buttons 224 and the second set of visual indicators 240 correlates or corresponds to respective ones of the second set of identification buttons 226. As shown, the first set of visual indicators 238 is adjacent (e.g., above) the second set of visual indicators 240. In this example, the first set of visual indicators 238 includes a first plurality of visual indicators 236 (e.g., eight visual indicators) and the second set of visual indicators 240 includes a second plurality of visual indicators 236 (e.g., eight visual indicators). In the example of FIG. 2, each of the visual indicators 236 corresponds to a respective one of the identification buttons 224 (numbered one through eight) of the keypad 204 and each of the visual indicators 240 corresponds to a respective one of the identification buttons 226 (numbered nine through sixteen) of the keypad 204. In this example, the display panel 234 also includes a visual indicator 246 disposed between the first and second sets of visual indicators 238 and 240 that correlates or corresponds to the enter button 232.

The people meter 110 periodically or aperiodically prompts the audience member(s) 116 via the display panel 234 to indicate whether they are present in the media exposure area 112 by pressing, for example, a corresponding one of the identification buttons 224, 226 to which that particular audience member(s) 116 is assigned. For example, the people meter 110 may provide a prompt by activating one or more of the visual indicators 236 when unidentified audience member(s) 116 are located in the media exposure area 112 (see for example, U.S. Pat. No. 7,203,338, which is hereby incorporated herein by reference, for example methods of detecting an unidentified audience member), and/or may prompt an audience member 116 via the visual indicators 236 after the content exposure metering device 108 detects a channel change and/or a change in state of the information presenting device 104. In other examples, the content exposure metering device 108 may include at least one sensor and/or be communicatively coupled to at least one sensor that detects a presence of the audience member(s) 116 in the media exposure area 112. The sensors may include, for example, motion sensors, heat sensors, infrared object detection sensors, etc. In addition to the visual indicators 236, the people meter 110 may provide an audible tone to prompt the audience member to self-identify.

Figure 3A:
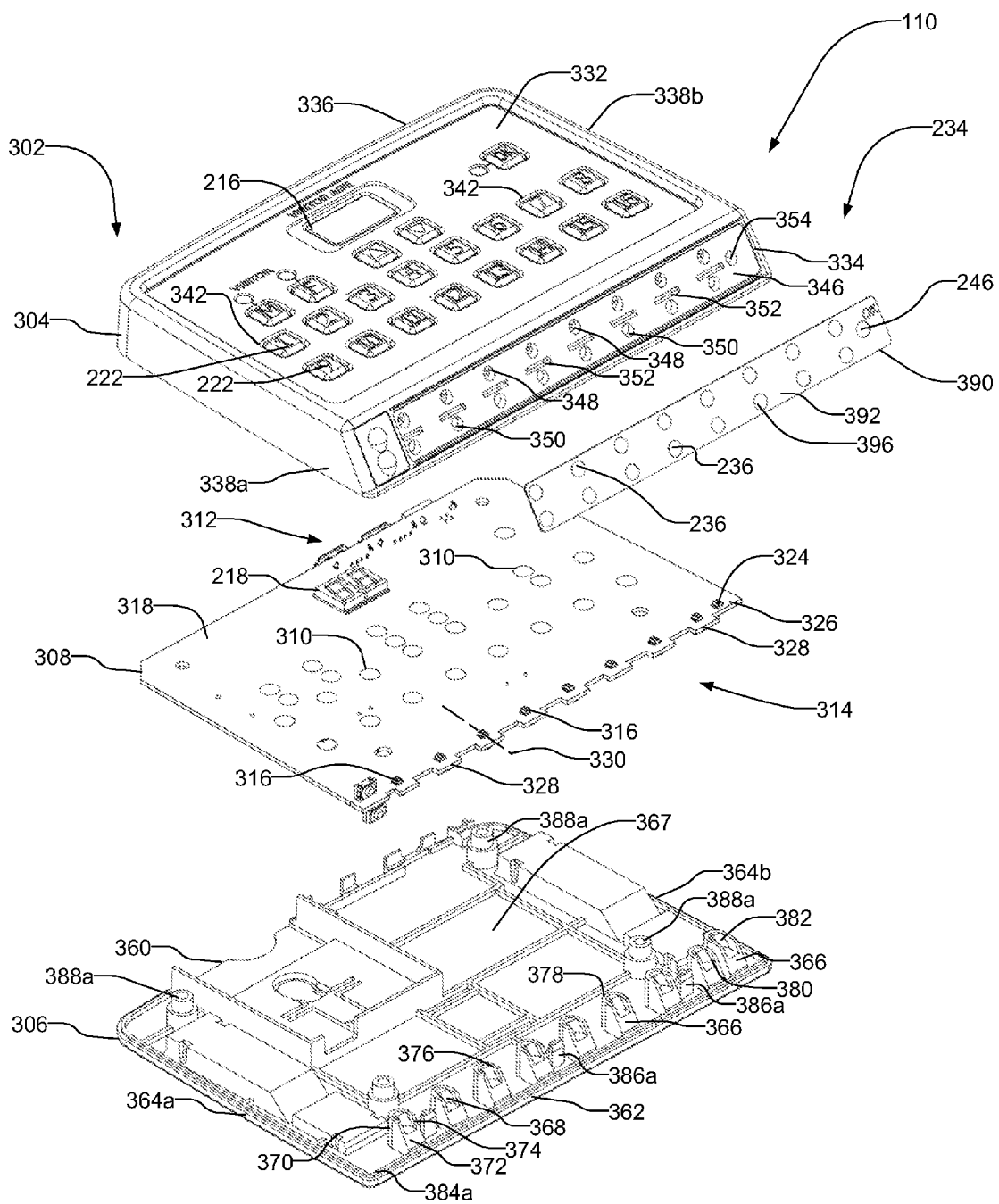
FIGS. 3A and 3B are exploded views of the example people meter of FIGS. 1 and 2.
Figure 3B:
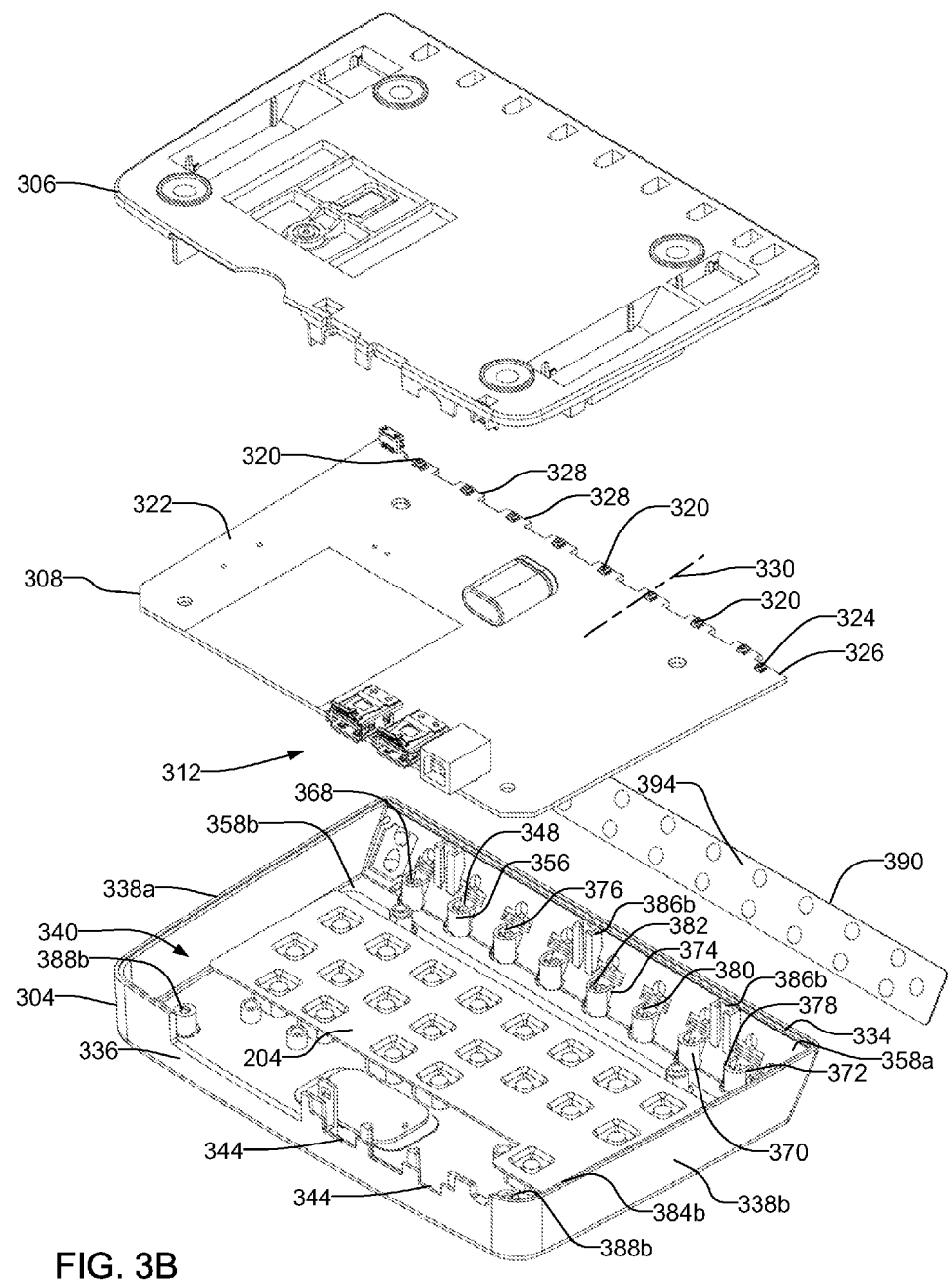

FIGS. 3A and 3B are exploded views of the example people meter 110 of FIG. 2. Referring to FIGS. 3A and 3B, the example people meter 110 includes a housing 302 having a first lid or upper panel 304 and a second lid or lower panel 306 that capture a printed circuit board 308 (PCB) therebetween. As shown, the printed circuit board 308 includes the display 218 of the visitor age input interface 208 and includes a plurality of contacts 310 corresponding to the identification buttons 222 and the enter button 232 of the keypad 204. Each of the identification buttons 222 of the keypad 204 may include a contact such that when a user presses one of the identification button 228 and 230 toward the printed circuit board 308, the contact electrically engages a respective one of the contacts 310 to form a circuit that sends a signal via a trace (e.g., a copper line on the PCB) to a processor. The printed circuit board 308 also includes a communication interface 312 to enable a connection to, for example, the content exposure metering device 108, an Ethernet, a digital subscriber line (DSL), a coaxial cable, a data transmission cable, wireless connection, and/or another domain or network.

In the example of FIG. 3A, the printed circuit board 308 includes a light source 314 such as, for example, a light emitting diode that emits light when energized. In the example of FIG. 3A, the light source 314 includes a first plurality of light emitting diodes 316 that are surface mounted to a first (e.g., upper) surface 318 of the printed circuit board 308 and a second plurality of light emitting diodes 320 that are surface mounted to a second (e.g., lower) surface 322 of the printed circuit board 308 opposite the upper surface 318 (see FIG. 3B). Each of the light emitting diodes 316 provides illumination to a respective one of the visual indicators 236 of the first set of the visual indicators 238 and each of the light emitting diodes 320 provides illumination to a respective one of the visual indicators 236 of the second set of visual indicators 240. Thus, a first light emitting diode from the plurality of light emitting diodes 316 illuminates a first visual indicator from the first plurality 238 of visual indicators 236 and a first light emitting diode from the plurality of light emitting diodes 320 illuminates a first visual indicator from the second plurality 240 of visual indicators 236. The printed circuit board 308 of the illustrated example also includes a light emitting diode 324 that provides illumination to the enter or OK visual indicator 246. The light emitting diodes 316, 320 and/or 324 may provide a clear (e.g., white) light, one or more colored lights (e.g., a green light, a red light, etc.), or any combination thereof.

An edge 326 of the printed circuit board 308 includes a plurality of protruding tabs 328. In the example of FIGS. 3A and 3B, each of the light emitting diodes 316 and 320 of the printed circuit board 308 is adjacent or aligned with one of the respective tabs 328. For example, each of the light emitting diodes 316 is aligned or centered relative to respective ones of the tabs 328 about an axis 330.

The upper panel 304 includes a top surface 332, a front wall 334 and a rear wall 336 that are joined by side walls 338a and 338b to define a cavity 340. The top surface 332 has apertures 342 to receive the keypad 204 (e.g., a rubber keypad) and the aperture or opening 216 to receive the display 218 of the visitor age input interface 208. The rear wall 336 includes openings 344 (see FIG. 3B) to receive or allow access to, for example, the communication interface 312 of the printed circuit board 308 when the printed circuit board 308 is coupled to the housing 302.

In the illustrated example, the front wall 334 is at an angle (e.g., a 30 degree angle, a 45 degree angle, etc.) relative to the top surface 332. The front wall 334 includes an outer or front surface 346 that defines at least a portion the display panel 234. The front wall 334 includes a first row or upper plurality of light ports 348 adjacent a second row or lower plurality of light ports 350. For example, the plurality of light ports 348 includes eight light ports and the lower plurality of light ports 350 also includes eight light ports. A plurality of openings or slots 352 is disposed between the plurality of upper and lower light ports 348 and 350. The front wall 334 also includes a light port 354 adjacent one of the slots 352.

In the illustrated example, the upper panel 304 includes one or more upper posts 356 that are disposed within the cavity 340 adjacent an inner surface 358a of the front wall 334. The upper posts 356 protrude away from an inner surface 358b of the upper panel 304 and toward the lower panel 306. In the illustrated example, the upper panel 304 is composed of a plastic material (e.g., a polymer or plastic resin material) and is manufactured as a unitary piece or structure via, for example, injection molding. Thus, in this example, the upper posts 356 are integrally formed with the upper panel 304.

The lower panel 306 includes a rear edge 360 and a font edge 362 joined by side edges 364a and 364b. The lower panel 306 also includes one or more posts 366 that protrude away from a surface 367 of the lower panel 306 and toward the upper panel 304. In this example, the lower panel 306 is composed of a plastic material (e.g., a polymer or plastic resin material) and is manufactured as a unitary piece or structure via, for example, injection molding. Thus, in this example, the lower posts 366 are integrally formed with the lower panel 306.

Each of the upper and lower posts 356 and 366 define an internal chamber 368 (e.g., a reflective chamber). In the illustrated example, each of the lower posts 366 includes a wall portion 370 having a semi-circular shape or body and an angled portion 372. The angled portion 372 of each posts 366 includes a surface 374 having an angle that is substantially similar (e.g., identical) to the angle of the front wall 334 so that the angled portion 372 is substantially parallel to (e.g., matably engages or aligns with) the front wall 334 when the upper panel 304 is coupled to the lower panel 306. The chamber 368 of each post 366 has an opening 376 adjacent an end 378 (e.g., a top end or upper end) of the wall portion 370 and has an opening 380 adjacent the angled portion 372. In other words, the chamber 368 of each post 366 has three closed sides and an open top.

The upper posts 356, like the lower posts 366, have an outer wall 370 that has a semi-circular shape or body and an angled portion 372. However, the outer walls 370 of the upper posts 356 are open at their bottoms to receive a respective one of the light emitting diodes 316. The angled portion 372 of each post 356 includes a surface 374 having an angle that is substantially similar (e.g., identical) to the angle of the front wall 334 so that the angled portion 372 is substantially parallel to (e.g., matably engages or aligns with) the front wall 334 when the upper panel 304 is coupled to the lower panel 306. The chamber 368 of each post 356 has an opening 376 adjacent an end 378 (e.g., a bottom end or lower end) of the wall portion 370 and has an opening 380 adjacent the angled portion 372. In other words, the chamber 368 of each post 356 has three closed sides and an open bottom.

As described in greater detail below in connection with FIG. 4, an inner surface 382 of the chambers 368 of the upper and/or lower posts 356 and 366 may include any shape (e.g., may have beveled and/or angled surfaces, angles of deflection, etc.) to reflect light provided by the light source 314. Further, in some examples, the inner surface 382 of the chamber 368 of the upper and/or lower posts 356 and 366 is highly polished or includes a chrome finish (e.g., applied via spraying) resulting in a mirror-like surface or material to enhance the efficiency of the chamber 368 for reflecting, deflecting and/or channeling the light toward the opening 380 of the angled portion 372 and toward the respective upper and lower light ports 348 and 350.

When the upper panel 304 is coupled to the lower panel 306, a raised lip 384a (e.g., a continuous lip) of the lower panel 306 engages a recessed lip 384b of the upper panel 304 to facilitate alignment of the upper and lower panels 304 and 306. Further, alignment clips 386a disposed between the lower posts 366 of the lower panel 306 are slidably received by retaining members 386b of the upper panel 304. A plurality of bosses 388a of the lower panel 306 align with a plurality of bosses 388b of the upper panel 304 to receive fasteners (not shown) that couple the upper and lower panels 304 and 306. Thus, in this example, the upper panel 304 is coupled to the lower panel 306 via fasteners (not shown) such as, for example, mechanical fasteners (e.g., screws). In other examples, the upper and lower panels 304 and 306 may be coupled via snap-fit connection (e.g., via clips received by slots), chemical fasteners, or may be coupled via any other suitable fastener and/or fastening process(es).

When the upper and lower panels 304 and 306 are coupled together, the printed circuit board 308 is captured between the upper and lower panels 304 and 306 of the housing 302. In particular, the tabs 328 of the printed circuit board 308 are received within the slots 352 of the front wall 334. Thus, each of the tabs 328 is disposed within a respective one of the slots 352. When the tabs 328 are engaged with the slots 352, light emitting diodes 316 are positioned in relatively close proximity to (e.g., adjacent or immediately next to) the respective light ports 348 and the light emitting diodes 320 are positioned in relatively close proximity to (e.g., adjacent or immediately next to) the respective light ports 350. For example, each light emitting diode 316 of the upper surface 318 is immediately adjacent a respective one of the light ports 348. Likewise, each light emitting diode 320 of the lower surface 322 is immediately adjacent a respective one of the light ports 350. Additionally or alternatively, the tabs 328 provide structural support to the printed circuit board 308 when coupled within the slots 352.

Further, when the upper panel 304 and the lower panel 306 are coupled together, each chamber 368 of the upper posts 356 receives at least a portion of a respective one of the upper light emitting diodes 316 and each chamber 368 of the lower posts 366 receives at least a portion of a respective one of the lower light emitting diodes 320. Thus, in this example, each chamber 368 of the upper and lower posts 356 and 366 receives a light emitting diode from the respective plurality of upper and lower light emitting diodes 316 and 320. In other words, a first upper post of the plurality of upper posts 356 receives a first light emitting diode from the plurality of upper light emitting diodes 316 and a first upper post of the plurality of lower posts 366 receives a first light emitting diode from the plurality of light emitting diodes 320. Significantly, the alignment of the tabs 328 of the printed circuit board 308 and the slots 352 of the housing 302 restrain the printed circuit board 308 in a fixed position relative to the housing such that the light emitting diodes 316 and 320 are automatically aligned with and/or captured in their respective chamber 368, thereby simplifying the manufacturing process.

The lower ends 378 of the upper posts 356 are immediately adjacent to or engage the upper surface 318 of the printed circuit board 308. The upper ends 378 of the lower posts 366 are immediately adjacent to or engage the lower surface 322 of the printed circuit board 308 so that each individual light emitting diodes 316, 320 is at least partially enclosed or received by the chamber 368 of a respective upper and/or lower post 356 and 366. In some examples, each of the light emitting diodes 316 and 320 is fully enclosed or received by a respective chamber 368. In this manner, the opening 376 at the lower end 378 of the upper posts 356 and the opening 376 at the upper end 378 of the lower posts 366 are substantially sealed or blocked so that the wall portion 370 of the upper and lower posts 356 and 366 substantially directs, deflects, channels or reflects the light emitted by the light emitting diodes 316 and 320 toward the opening 380 of the angled portion 372 and, thus, the respective ones of the light port opening 348 and 350 that are in communication with that particular opening 380 of the chamber 368 of the respective upper and lower posts 356 and 366. Further, each opening 380 of the upper posts 356 is in communication with a respective one of the light ports 348. Similarly, each opening 380 of the lower posts 366 is in communication with a respective one of the light ports 350 when the lower panel 306 is coupled to the upper panel 304. In other words, the opening 380 of a first upper post from the plurality of upper posts 356 is in communication with a light port from the plurality of light ports 348 and the opening 380 of a first lower post from the plurality of lower posts 366 is in communication with a light port from the plurality of light ports 350.

In the illustrated example, the display panel 234 includes a dome 390 that is attached to the front surface of the front wall 334 via, for example, adhesive. The dome 390 includes a front portion 392 that includes the first set 238 of visual indicators 236 and the second set 240 of visual indicators 236, and a rear portion 394 having a substantially flat surface. In this example, the visual indicators 236 are spherically shaped members 396 that protrude from the front portion 392 of the dome 390. Each of the visual indicators 236 is in communication with a respective one of the light ports 348 and 350. In other words, a visual indicator 236 from the first plurality of visual indicators 238 is in communication with a light port from the plurality of light ports 348 and a visual indicator 236 from the second plurality of visual indicators 240 is in communication with a light port from the plurality of light ports 350.

In particular, the rear portion 394 of the dome 390 engages or is coupled to the front surface 346 of the front wall 334 such that each visual indicator 236 is aligned with (e.g., coaxially aligned) or in optical communication with respective ones of the upper light ports 348 and 350. In this example, the dome 390 is a translucent dome and the rear portion 394 diffuses a point or directional light emitted by the light emitting diodes 316 and 320 so that the light is substantially, evenly distributed across a surface area of the respective visual indicators 236.

Figure 4:
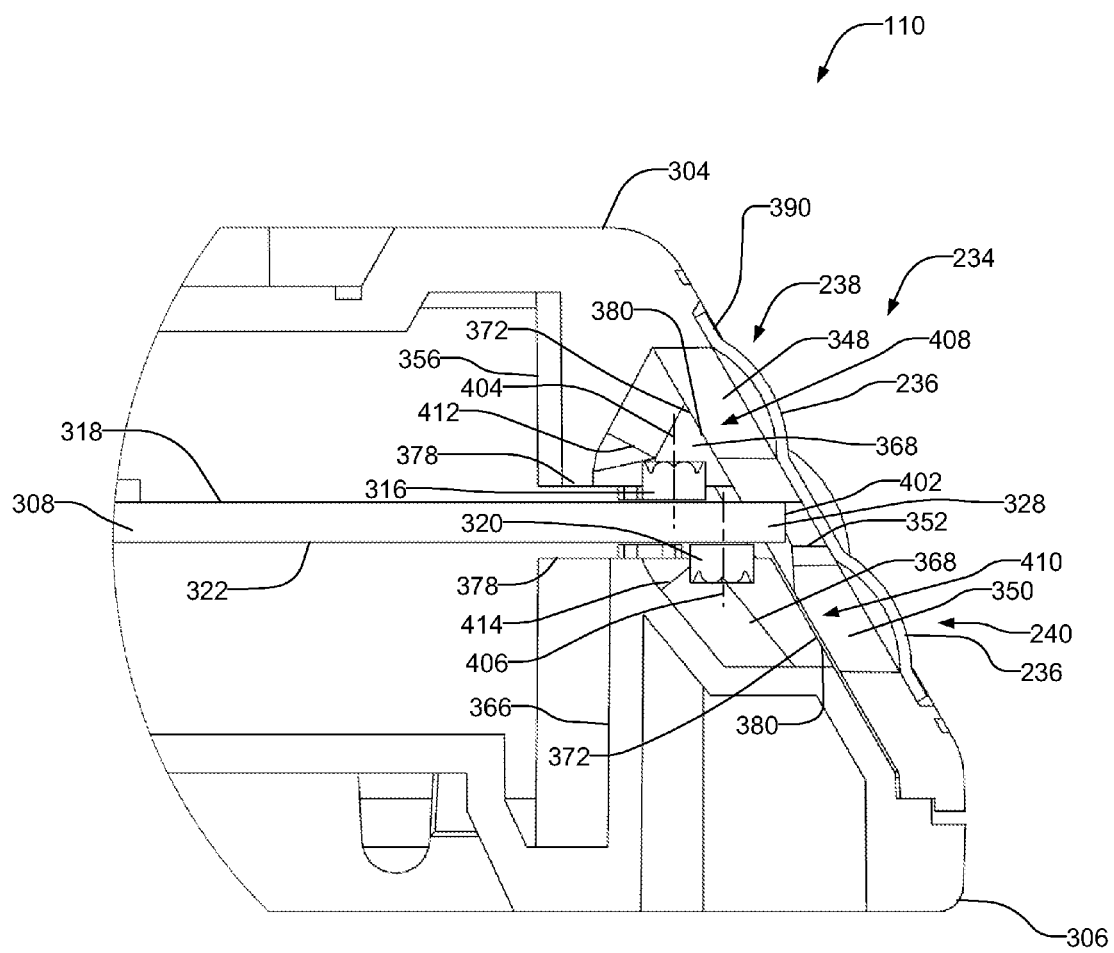
FIG. 4 is a cross-sectional view of the example people meter of FIGS. 1, 2, 3A and 3B.

FIG. 4 is a cross-sectional view of the example people meter 110 of FIGS. 2, 3A and 3B. Referring to FIG. 4, to assemble the people meter 110, the printed circuit board 308 is disposed within the cavity 340 of the upper panel 304. In particular, the tabs 328 of the printed circuit board 308 are disposed within the corresponding slots 352 of the front surface 346 of the upper panel 304.

In this example, because the wall portion 334 is at an angle, the first and second plurality of light emitting diodes 316 and 320 are mounted in a substantially off-set relationship such that the first plurality of light emitting diode 316 are recessed or positioned farther away from an edge 402 of the tabs 328 than the second plurality of light emitting diodes 320 are positioned relative to the edge 402. For example, an axis 404 of the first light emitting diodes 316 is eccentric or spaced away relative to an axis 406 of the second light emitting diodes 320 when the light emitting diodes 316 and 320 are coupled to the printed circuit board 308. In this manner, the light emitting diodes 316 of the upper surface 318 of the printed circuit board 308 are immediately adjacent or proximate to the light ports 348 and the lower light emitting diodes 320 of the lower surface 322 are immediately adjacent or proximate to the light ports 350. The lower panel 306 is then coupled to the upper panel 304 and the dome 390 is coupled to the front surface 346 of the upper panel 304.

However, in other examples, the front wall 334 may be at a substantially perpendicular angle relative to the top surface 332 (e.g., may be substantially straight or vertical). In such an example, the plurality of light emitting diodes 316 may be substantially aligned with the plurality of light emitting diodes 320 such that, for example, the axis 404 is coaxially aligned with the axis 406.

As shown in FIG. 4, the light emitting diode 316 of the upper surface 318 of the printed circuit board 308 is received by the chamber 368 of the upper post 356 and the light emitting diode 320 of the lower surface 322 of the printed circuit board 308 is received by the chamber 368 of the lower post 366. In particular, the lower end 378 of the chamber 368 of the upper post 356 is adjacent the upper surface 318 of the printed circuit board 308 and the upper end 378 of the chamber 368 of the lower post 366 is adjacent the lower surface 322 of the printed circuit board 308. In this manner, the light emitted by the light emitting diode 316 is directly emitted within the chamber 368 of the upper post 356 and the light emitted by the light emitting diode 320 is directly emitted within the chamber 368 of the lower post 366.

In the illustrated example, the chambers 368 of the upper posts 356 include a non-smooth, beveled and/or angled surface 412 (e.g., a first angle of deflection) and the chamber 368 of upper posts 356 include a non-smooth, beveled and/or angled surface 414 (e.g., a second angle of deflection). The surfaces 412 and 414 enhance the effectiveness of the chamber 368 to deflect and/or reflect light toward the openings 380 and, thus, to the respective light ports 348, 350. In the illustrated example, the surface 412 of the chambers 368 of the upper posts 356 are different from the surface 414 of the chambers 368 of the lower posts 366. In some examples, the surface 412 of the chambers 368 of the upper posts 356 may be similar to the surface 414 of the chambers 368 of the lower posts 366.

The angled portion 372 of the upper post 356 and the angled portion 372 of the lower post 366 are substantially parallel to the front wall 334 of the upper panel 304 such that the opening 380 of the angled portion 372 of the upper post 356 is in direct communication with the light port 348 and the opening 380 of the angled portion 372 of the lower post 366 is in direct communication with the light port 350. In turn, the light port 348 is in direct communication with the visual indicator 23 of the first set of visual indicators 238 of the dome 390 and the light port 350 is in direct communication with the visual indicator 236 of the second set of visual indicators 240 of the dome 390.

In operation, the people meter 110 receives a signal (e.g., via the communication interface) and a processor (not shown) activates or causes one or more of the light emitting diodes 316 and 320 to illuminate corresponding one(s) of the visual indicators 236 to activate or prompt audience member(s) 116 to enter an input to identify their presence. For example, the light emitting diode 316 may illuminate the visual indicator 236 of the first set of visual indicators 238 to prompt an audience member 116 to self-identify. When the light emitting diode 316 is illuminated, light (e.g., red light) is transmitted directly within the chamber 368 of the upper post 356. The wall portion 370 and/or the inner surface 382 reflects and/or deflects the light toward the opening 380 of the angled portion 372, which is in communication with the light port 348. Additionally, the chamber 368 may include a mirror-like or polished finish, which increases the efficiency of the reflection provided by the chamber 368. Thus, the chamber 368 reflects, deflects or channels the light emitted by the light emitting diode 316 toward the light port 348 that is in direct communication with the chamber 368. Thus, in this example, the chamber 368 and the light port 348 provide a light passageway 408 that is integrally formed with the housing 302 of the people meter 110. In particular, the light passageway 408 provides a light travel pathway between the light emitting diode 316 of the upper surface 318 and the visual indicator 236 of the first set of visual indicators 238 of the dome 390. Thus, the chambers 368 of the upper posts 356 are in communication with respective light ports 348 to provide a light passageway 408 integrally formed with the housing 302. Likewise, the chambers 368 of the lower posts 366 and the respective light ports 350 provide a light passageway 410 integrally formed with the housing 302. Neither of the light passageways 408 and 410 requires a light pipe or light tube.

For example, light is transmitted via the passageway 408 from one of the light emitting diode 316 to the respective one of the visual indicators 236 of the first set of visual indicators 238 that is in communication with that particular one of the light emitting diode 316 and respective one of the light port 348. The translucent dome 390 defuses or scatters the light provided by the light emitting diode 316 so that the light emitted from the visual indicator 236 is distributed or scattered substantially evenly across a surface area of the visual indicator 236. In this manner, the dome 390 softens the intensity of the light emitted by the light emitted diode 316 and widens the pattern of the light beam to illuminate substantially the entire surface of the visual indicator 236. However, the visual indicator 236 is clearly illuminated to be readily seen by audience member(s) 116. Once an audience member 116 self-identifies, that light emitting diode 316 is switched off to provide an indication to the audience member 116 that his or her entry has been received.

Figure 5:
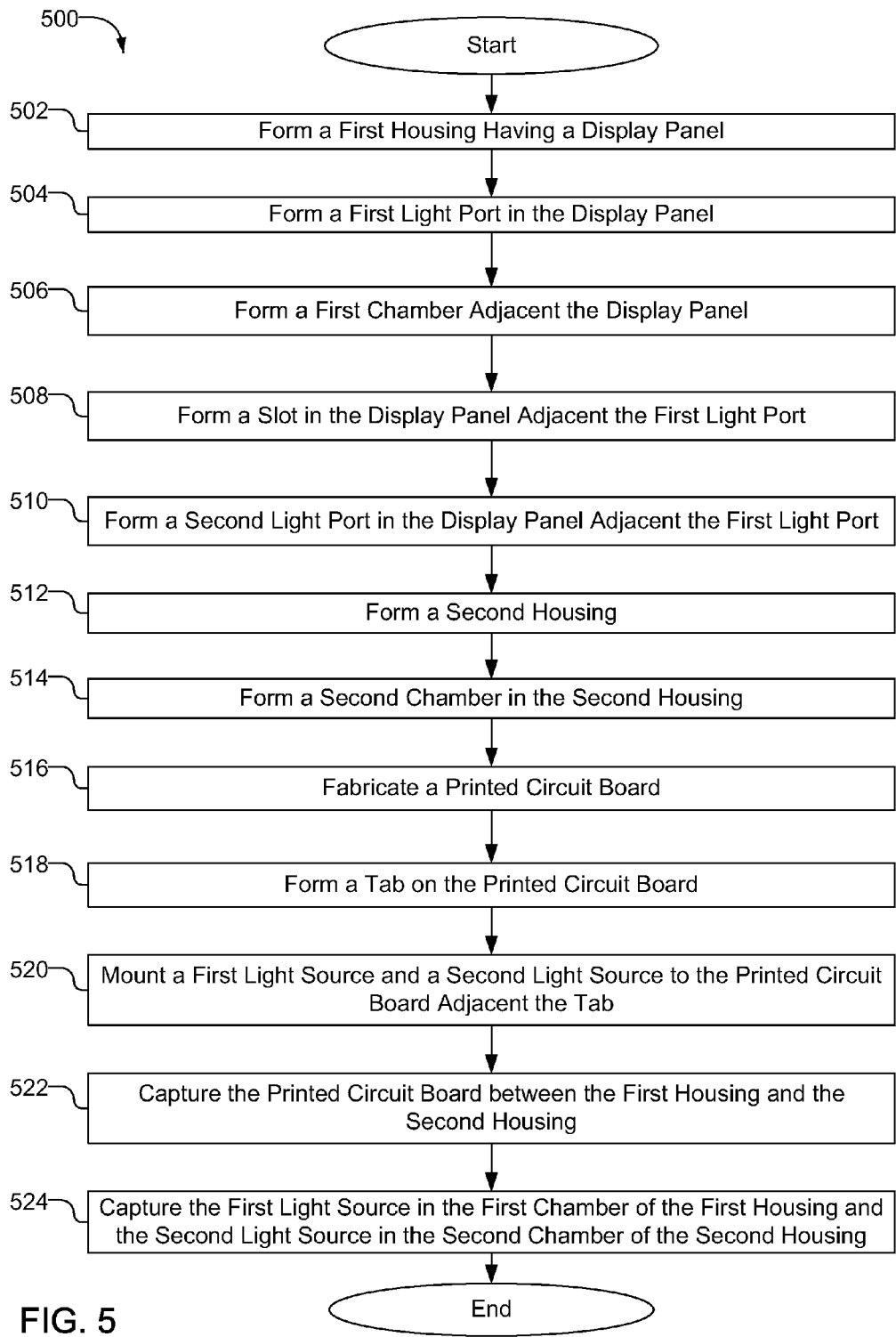
FIG. 5 is a flowchart of an example method of manufacturing an example electronic device disclosed herein.

FIG. 5 is a flowchart of an example method of manufacturing an example electronic device disclosed herein (e.g., the people meter 110). The method 500 includes forming a first housing (e.g., the upper panel 304) having a display panel (e.g., the display panel 234) (block 502). The method 500 also includes forming a first light port (e.g., the plurality of light ports 348) in the display panel (block 504), and forming a first chamber (e.g., the plurality of chambers 368) adjacent the display panel and/or the first light port (block 506). The method 500 of the illustrated example also includes forming a slot (e.g., the plurality of slots 352) in the display panel adjacent the first light port (block 508). In some instances, for example, when the display panel is to provide a first set of visual indicators (e.g., the visual indicators 238) and a second set of visual indicators (e.g., the visual indicators 240), the method 500 may also include forming a second light port (e.g., the plurality of light ports 350) in the display panel adjacent the first light port (block 510). For example, the second light port may be formed in the display panel such that the slot is positioned between the first light port and the second light port. In the illustrated example, the first housing, the display panel, the first light port, the first chamber, the slot and the second light port are formed as a unitary structure via, for example, injection molding. In other examples, the first housing, the display panel, the first light source, the first chamber, the slot and/or the second light port may be formed via machining or any other manufacturing process(es) and/or may be separate parts that are assembled, coupled or fastened together.

Further, the method 500 includes forming a second housing (e.g., the lower panel 306) to couple to the first housing (block 512). When the display panel includes the second light port, the method 500 includes forming a second chamber (e.g., the plurality of chambers 368) in the second housing (block 514). The second housing may also be formed as a unitary piece or structure via, for example, injection molding, and/or any other manufacturing process(es).

Forming the first chamber may include, for example, forming a first post (e.g., the plurality of posts 356) extending from an inner surface (e.g., the inner surface 358b) of the first housing and adjacent the display panel. Similarly, forming the second chamber may include, for example, a second post (e.g., the plurality of posts 366) extending from an inner surface (e.g., the inner surface 367) of the second housing. Each post of the first housing and/or the second housing, for example, may define a cylindrical body portion (e.g., the wall portion 370) and an angled portion (e.g., the angled portion 372) such that the angled body portion defines a first opening (e.g., the opening 376) and the cylindrical body portion defines a second opening (e.g., the opening 380).

The method 500 also includes fabricating a printed circuit board (e.g., the printed circuit board 306) with logic to operate a people meter (block 516). The printed circuit board is cut or otherwise machined to form a tab (e.g., the plurality of tabs 328) for mating or engaging the slot of the first housing (block 518). Such a printed circuit board includes mounting (e.g., surface mounting) a first light source (e.g., the plurality of light emitting diodes 316) and a second light source (the plurality of light emitting diodes 320) on the printed circuit board (block 520). For example, the first light source may be surface mounted to a first side (e.g., the first side 318) of the printed circuit board and the second light source may be surface mounted to a second side (e.g., the second side 322) of the printed circuit board. In the examples where the second set of visual indicators is not provided by the display panel, the printed circuit board need not include the second light source and/or the second housing need not include the second chamber.

The method 500 also includes capturing the printed circuit board between the first housing and the second housing such that the tab is received, arranged or engaged with the slot of the display (block 522). Additionally, the method 500 includes capturing at least a portion of the first light source (e.g., the plurality of light emitting diodes 316) within the first chamber and capturing at least a portion of the second light source (e.g., the plurality of light emitting diodes 320) within the second chamber when the first housing is coupled to the second housing (block 524). The second chamber may be disposed adjacent the second light port when the second housing is coupled to the first housing to capture the printed circuit board therebetween.

As a result, the first chamber provides a direct optical pathway between the first light source and the first light port so that the first light source is positioned to illuminate the first light port. Likewise, the second chamber provides a direct optical pathway between the second light source and the second light port so that the second light source is positioned to illuminate the second light port. In other words, the first light source only illuminates the first light port associated with, or optically coupled to, the first chamber and the second light source only illuminates the second light port associated with, or optically coupled to, the second chamber. In this manner, the first chamber prevents illumination of another light port (e.g., another one of the light ports 348 and/or 350) adjacent the first light port and the second chamber prevents illumination of another light port (e.g., another one of the light ports 348 and/or 350) adjacent the second light port.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A printed circuit board, comprising:
   a tab having an end to be inserted into a slot of a housing;
   a first light source located a first distance from the end at a first position corresponding to a first chamber of a first panel of the housing, the first light source being mounted to a first surface of the printed circuit board; and
   a second light source located a second distance greater than the first distance from the end at a second position corresponding to a second chamber of a second panel of the housing, the second light source being mounted to a second surface of the printed circuit board opposite the first surface.

2. A printed circuit board as defined in claim 1, the first and second light sources being aligned with a first axis extending along the tab.

3. A printed circuit board as defined in claim 2, further comprising a first row of light sources including the first light source, the first row of light sources being aligned with a second axis perpendicular to the first axis.

4. A printed circuit board as defined in claim 3, further comprising a second row of light sources including the second light source, the second row of light sources being aligned with the second axis.

5. A printed circuit board as defined in claim 2, wherein ones of the first row of lights are spaced apart according to a layout of a row of chambers including the first chamber.

6. A printed circuit board as defined in claim 1, further comprising a row of tabs including the tab, the tabs being spaced apart according to a layout of a row of slots including the slot of the housing.

7. A printed circuit board as defined in claim 1, wherein the tab is inserted into the slot to align the first light source with the first chamber.

8. A chamber comprising:
a semi-circular wall extending from a first housing along an axis;
a first angled wall having a first surface angled relative to the axis, the first angled wall to matably engage an angled display panel having a light port; and
a second angled wall different than the first angled wall, the second angled wall to reflect light towards the light port of the angled display panel.

9. A chamber as defined in claim 8, the second angled wall being located within a cavity of the chamber.

10. A chamber as defined in claim 8, the first angled wall having an angle substantially similar to the angled display panel.

11. A chamber as defined in claim 8, the semi-circular wall having a first opening to receive a light source.

12. A chamber as defined in claim 11, the first angled wall having a second opening to provide the light to the light port of the angled display panel.

13. A chamber as defined in claim 8, the second angled wall having a chrome finish.

14. A chamber as defined in claim 8, the semi-circular wall to sealingly engage a surface of a printed circuit board having a light source mounted to the surface.

15. A printed circuit board as defined in claim 14, the semi-circular wall defining a cavity of the chamber to surround the light source.

16. An electronic device comprising:
a printed circuit board having a first row of light sources coupled to a first surface of the printed circuit board and a second row of light sources coupled to a second surface of the printed circuit board, the first and second rows of light sources being parallel;
a panel having a plurality of visual indicators;
a first housing having a first row of chambers each having a first opening to receive a respective one of the first row of light sources and a second opening to communicate light from the respective one of the first row of light sources to a respective one of the visual indicators; and
a second housing having a second row of chambers, each of the chambers having a third opening to receive a respective one of the second row of light sources and a third opening to communicate light from the respective one of the second row of light sources to a second respective one of the visual indicators.

17. An electronic device as defined in claim 16, wherein the printed circuit board comprises a plurality of tabs, each of the tabs to be inserted into a respective one of a plurality of slots in the panel.

18. An electronic device as defined in claim 17, wherein respective ones of the plurality of indicators are aligned with respective ones of the plurality of tabs.

19. An electronic device as defined in claim 16, wherein the first opening is defined by a semi-circular wall of the chamber, and the second opening is defined by an angled wall of the chamber.

20. An electronic device as defined in claim 19, wherein the angled wall of the chamber has a substantially similar angle as the panel.

* * * * *